Jan. 7, 1941.  H. A. SCHWARTZ ET AL  2,227,676

SAFETY PIN

Filed Dec. 13, 1938

INVENTORS
Harry A. Schwartz and Paul Hausheer
BY Knight Bros
ATTORNEYS

Patented Jan. 7, 1941

2,227,676

UNITED STATES PATENT OFFICE 2,227,676

SAFETY PIN

Harry A. Schwartz and Paul Hausheer, Astoria, Long Island, N. Y.; said Schwartz assignor to Sylvia M. Schwartz, Astoria, Long Island, N. Y.

Application December 13, 1938, Serial No. 245,366

6 Claims. (Cl. 24—158)

This invention relates to safety pins, and more particularly to self-closing safety pins which have a guard member normally resting over the point of the pin but capable of being withdrawn therefrom to expose the pin for insertion into the goods, after which the guard member automatically returns to cover the point.

An important object of the invention is to provide a construction of safety pin in which there is practically no danger of its opening except when intentionally opened by the user, but which, even if it should become detached from the goods, would automatically assume a closed or protected position so that it would not constitute such a menace to young children as the ordinary safety pin in common use.

The principles of the invention are susceptible of being embodied in various specific forms. For purposes of illustration, we have shown in the accompanying drawing a preferred form with certain modifications.

In said drawing—

Figure 1:
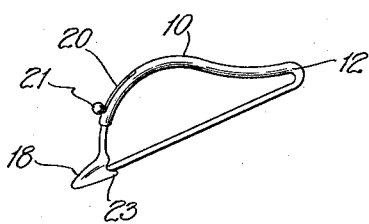
Figure 1 is a perspective view of the pin in normal, or closed, position.
Figure 2:
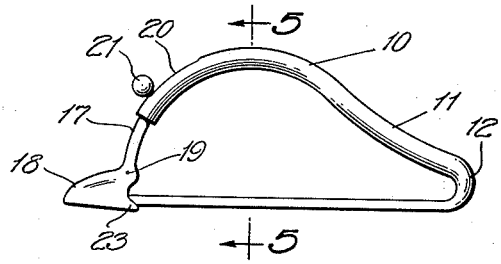
Figure 2 is a side elevation thereof.
Figure 3:
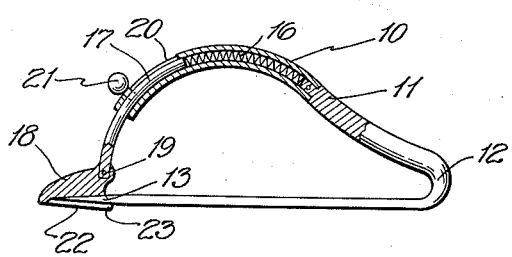
Figure 3 is a side elevation with parts in section, the pin being in its normal or closed position.
Figure 4:
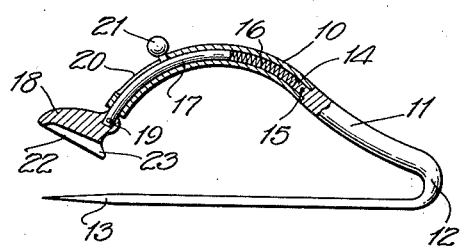
Figure 4 is a view similar to Figure 3, with the guard member held retracted from the point of the pin.
Figure 5:
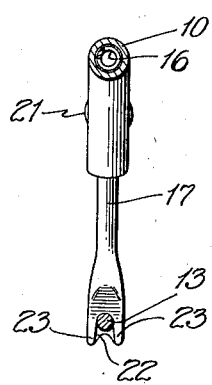
Figure 5 is a cross section of the device taken in the direction of the arrows and on the plane indicated at 5—5 of Figure 2.
Figure 6:
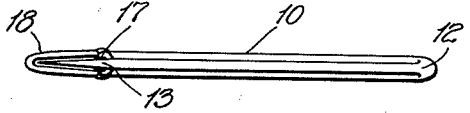
Figure 6 is an underneath view of the pin as viewed from beneath the guard member.
Figure 7:
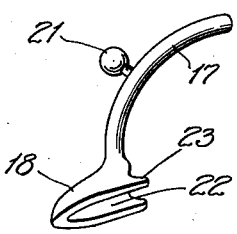
Figure 7 is a perspective view of one form of the guard member.

Referring in detail to the safety pin illustrated in Figures 1 to 7 inclusive, the construction here illustrated includes a tubular base or back 10 adapted to have securely mounted therein the rear or inner end of the pin member 11 which is looped or curved at the portion 12, from which curve the pin member extends toward the other end of the base 10 where it terminates in the point 13. The pin member may be formed with a reduced cylindrical end 14 for insertion into the end of the tubular base 10, where it is firmly secured as for example by the rivet or cross pin 15, either with or without soldering, welding or other expedient. A compression spring 16 is disposed in the tubular base 10 between the reduced end 14 of the pin member and the rear portion of a stem 17 which projects from the forward end of the tubular base member 10 and carries a guard member or shoe 18 which is secured thereon as by rivet 19, with or without additional strengthening as by soldering, welding or the like. The spring 16 is thus confined within the tubular base between the reduced end 14 of the pin member and the end of the stem 17. The tubular base 10 is slotted at 20 to form a guide for a knob or button 21, the shank of which is secured in the stem member 17 so that the operator, by engaging the knob 21, may retract the stem 17 against the compression of the spring 16 which returns the stem 17 to its forward position when the knob 21 is released. The stem 17 and the tubular base 10 are curved on a circular arc to permit this back and forth movement of the stem 17 within the tubular base 10. As previously indicated, Figure 3 shows the guard stem projected under the influence of the compression spring, and Figure 4 shows it retracted under the influence of manual operation of the button or knob 21. It will be clearly seen from these figures that the guard shoe 18 encloses the point of the pin 13 when projected, and exposes the point of the pin when retracted. The guard member 18, as clearly shown in Figures 4, 5, 6 and 7, has a bottom groove 22 which forms a seat or housing for the pin point 13, this groove being open on its underside so as to permit the guard to move over the pin point and out of this position in a direction generally transverse with respect to the pin point 13. To reduce the possibility of the pin point becoming accidentally exposed, the rear portion of the guard is preferably formed with hooks or spurs 23 which are directed rearward of the pin point and thus tend to hook into the goods under any tendency of the pin point to move rearwardly out of its engagement with the goods. Since the permitted movement of the guard member is essentially in a transverse direction with respect to the pin point, there is no tendency to open the guard accidentally when the pin is subjected to any force tending to withdraw it from the goods.

Figure 8:
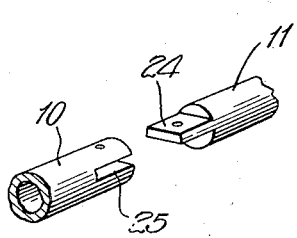
Figure 8 is a detailed perspective view showing a slightly modified form of joint between the pin member and the base member in which it is mounted.

Referring to Figure 8, the detail here shown relates to a somewhat different form of joint between the rear end of the pin member 11 and the tubular base member 10. In this embodiment of the joint, the base member need not be tubular clear to the rear end, but the adjoining ends of the base member and the pin member are provided with tongue and groove construction 24, 25, the two parts being riveted together or otherwise suitably secured when they have been assembled into firm contact with each other.

Figure 9:
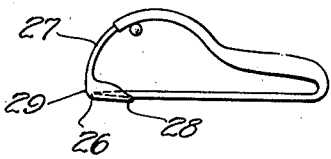
Figure 9 is a side elevation of another form of safety pin within the principles of the invention, illustrating a modified form and arrangement of the retractile guard member.

In Figure 9 the construction may be essentially the same as already described with respect to the other figures, but we have herein shown a guard member 26 which curves rearwardly from the stem member 27 to provide the hooks 28 within which the groove to receive the pin point, as already described, is formed. The forward portion 29 of the guard member is rounded to eliminate any tendency to catch in the goods when the pin is being applied in use.

In general, the construction requires for its most satisfactory operation a pin member which is quite stiff and unyielding, and for this reason the pin should be made rather rigid as compared with the ordinary safety pin. It requires no flexing, as the guard member moves instead of the pin member, in covering and uncovering the point.

We claim:

1. A safety pin comprising a tubular base, a pin member rigidly mounted on one end of said base and extending toward the other end thereof, a guard shoe having a point-receiving longitudinal groove along its under surface and mounted in said other end of the tubular base and movable therein into and out of point-enclosing position, in a direction substantially transverse of said pointed end, and a spring mounted in said tubular base and urging said guard member normally into protective engagement with the pointed end of said pin member.

2. A safety pin comprising a tubular, arcuate base having a pin member rigidly mounted in one end of said base and extending beneath the other end thereof, a guard member having an arcuate stem slidably fitted in said other end of the tubular base and having a guard shoe provided with a groove opening downwardly to permit the guard to pass transversely over the pointed end of said pin member, and a spring confined within the tubular base behind the end of said guard stem to urge said guard into a normal position over the pointed end of said pin member.

3. A safety pin comprising a base, a pin member rigidly mounted on one end of said base and extending toward the other end thereof, said other end of said base being directed inwardly toward the pointed end of the pin member, and a guard member movable on said other end of said base toward and away from the pointed end of said pin member in a direction generally transverse of said pointed end and restrained against movement longitudinally thereof, said guard member formed with an inwardly directed hook extending away from the pointed end of the pin member.

4. A safety pin comprising a slotted tubular base, a pin member rigidly mounted on one end of said base and extending toward the other end thereof, said other end of said base being directed inwardly toward the pointed end of the pin member, a guard member having a stem fitted into said other end of said tubular base and movable therein toward and away from the pointed end of said pin member in a direction substantially transverse of said pointed end, and a knob having its shank extending through the slot of said tubular base portion and mounted in the stem of said guard member for manual actuation thereof.

5. A safety pin comprising a base, a stiff pin member projecting rigidly from one end of said base and extending toward the other end thereof in substantially fixed unyielding relation thereto, and a guard shoe having a point-receiving longitudinal groove along its under surface and mounted on the other end of said base and movable with respect thereto in a path confined to a direction substantially transverse of the pointed end of the pin member, into and out of point-enclosing position, said base and guard shoe having a resilient connection normally urging said guard shoe into point-enclosing position.

6. A safety pin comprising a base, a pin member rigidly mounted on one end of said base and extending toward the other end thereof, a guard shoe having a point-receiving longitudinal groove along its under surface to permit the guard shoe to pass transversely over and enclose the pin point, and means for resiliently mounting said guard shoe on the said other end of the base and confining its movement to a direction generally transverse of the pointed end of the pin member.

HARRY A. SCHWARTZ.
PAUL HAUSHEER.